(12) United States Patent
DaSilva et al.

(10) Patent No.: US 6,493,868 B1
(45) Date of Patent: Dec. 10, 2002

(54) INTEGRATED DEVELOPMENT TOOL

(75) Inventors: Greg N. DaSilva, Rexdale (CA); Paul Gingrich, Toronto (CA); Raju Pandey, Toronto (CA)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/432,644

(22) Filed: Nov. 2, 1999

(Under 37 CFR 1.47)

Related U.S. Application Data

(60) Provisional application No. 60/106,572, filed on Nov. 2, 1998.

(51) Int. Cl.[7] .................................................. G06F 9/44
(52) U.S. Cl. ........................ 717/105; 717/105; 717/108; 717/111; 717/129; 717/130; 345/540; 345/1.3
(58) Field of Search .................................. 717/9, 5, 7, 4, 717/8, 141–148, 100–103, 110–120, 124–131; 345/540, 1.3

(56) References Cited

U.S. PATENT DOCUMENTS

| | | | | |
|---|---|---|---|---|
| 5,524,244 A | * | 6/1996 | Robinson et al. | 717/7 |
| 5,933,641 A | * | 8/1999 | Ma | 717/5 |
| 5,950,000 A | * | 9/1999 | O'Leary et al. | 717/1 |
| 5,983,017 A | * | 11/1999 | Kemp et al. | 717/4 |
| 6,079,032 A | * | 6/2000 | Peri | 714/38 |
| 6,240,549 B1 | * | 5/2001 | Hamada et al. | 717/144 |

* cited by examiner

Primary Examiner—Tuan Q. Dam
Assistant Examiner—Chuck Kendall
(74) Attorney, Agent, or Firm—Gerald E. Laws; W. James Brady, III; Frederick J. Telecky, Jr.

(57) ABSTRACT

An integrated code development tool, comprising of an editor, a project management and build system, a debugger, a profiler, and a graphical data visualization system. The editor is operable to provide a source code view which is simultaneously capable of integrating with said debugger to provide for stepping through code and setting breakpoints, and integrating with the output of said build system to display source code interleaved with corresponding assembler code created by said build system.

19 Claims, 4 Drawing Sheets

```
Volume.c                                              _ 🗗 X

/*
 * ======== main ========
 */
Void main ()
00001780  01BC94F6        STW.D2    B3,*SP--[0x4]
{
    LOG_printf (&trace, "volume example started\n") ;
    00001784  00031610        B.S1      LOG_printf
    00001788  00000000        NOP
    0000178C  02037A2A        MVK.S2    0x6F4,B4
    00001790  018BD62A        MVK.S2    0x17AC,B3
    00001794  0240006B        MVKLH.S2  0x8000,B4
    00001798  0203A829 ||     MVK.S1    0x750,A4
    0000179C  00000000 ||     NOP
    000017A0  023C22F7        STW.D2    B4,*+SP[0x1]
    000017A4  0180006B ||     MVKLH.S2  0x0,B3
    000017A8  02400068 ||     MVKLH.S1  0x8000,A4

RTDX_enableInput (&control_channel) ;
    000017AC  0001C510        B.S1      RTDX_enableIn
```

FIG. 4
```
Volume.c
/*
 * ======== main ========
 */
Void main ()
00001780  01BC94F6              STW.D2      B3,*SP--[0x4]
{
    LOG_printf (&trace, "volume example started\n") ;
    00001784  00031610             B.S1        LOG_printf
    00001788  00000000             NOP
    0000178C  02037A2A             MVK.S2      0x6F4,B4
    00001790  018BD62A             MVK.S2      0x17AC,B3
    00001794  0240006B             MVKLH.S2    0x8000,B4
    00001798  0203A829  | |        MVK.S1      0x750,A4
    0000179C  00000000  | |        NOP
    000017A0  023C22F7             STW.D2      B4,*+SP[0x1]
    000017A4  0180006B  | |        MVKLH.S2    0x0,B3
    000017A8  02400068  | |        MVKLH.S1    0x8000,A4
    RTDX_enableInput (&control_channel) ;
    000017AC  0001C510             B.S1        RTDX_enableIn
```
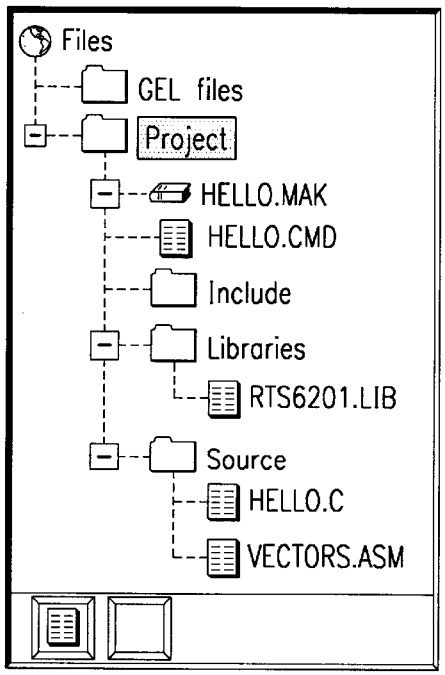
FIG. 5
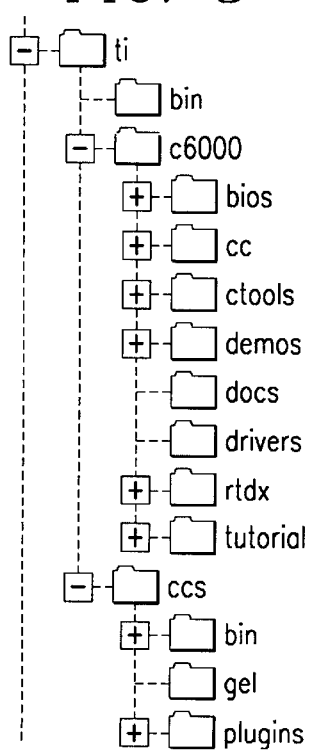
FIG. 8

INTEGRATED DEVELOPMENT TOOL

This application claims priority under 35 USC §119 (e)(1) of Provisional Application Serial No. 60/106,572. filed Nov. 2, 1998.

TECHNICAL FIELD OF THE INVENTION

This invention relates to integrated development tools.

SUMMARY OF THE INVENTION

The present invention provides an integrated development tool.

BRIEF DESCRIPTION OF THE DRAWINGS

FIG. 4 represents an editor window for viewing C source code with the equivalent assembly instructions shown after the C statements as depicted;

FIG. 5 represents a project file used to build an application;

FIG. 8 illustrates a directory of folders for an installed integrated development tool.

DETAILED DESCRIPTION

Figure 1:
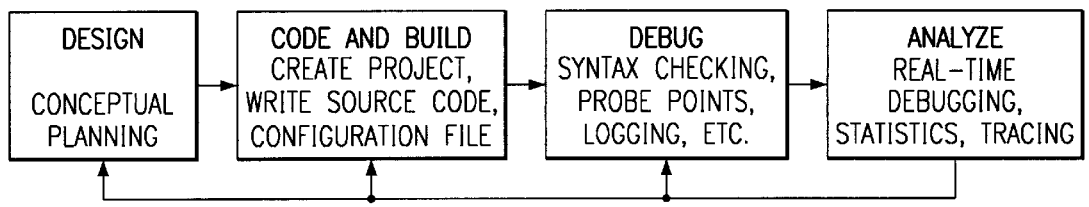
FIG. 1 is a flow chart illustrating development cycle phases.

The integrated development tool of the present invention gives developers of applications for digital signal processor (DSP) chips the ability to develop and analyze embedded real-time software. It provides easy-to-use tools for configuring, building, debugging, tracing, and analyzing programs. It also includes a set of application program interface (API) calls for real-time tasks. The integrated development tool extends basic DSP software tools with an equally essential set of debugging and real-time analysis capabilities. The integrated development tool supports the development cycle phases of design, code & build, debug, and analysis depicted in FIG. 1.

Figure 2:
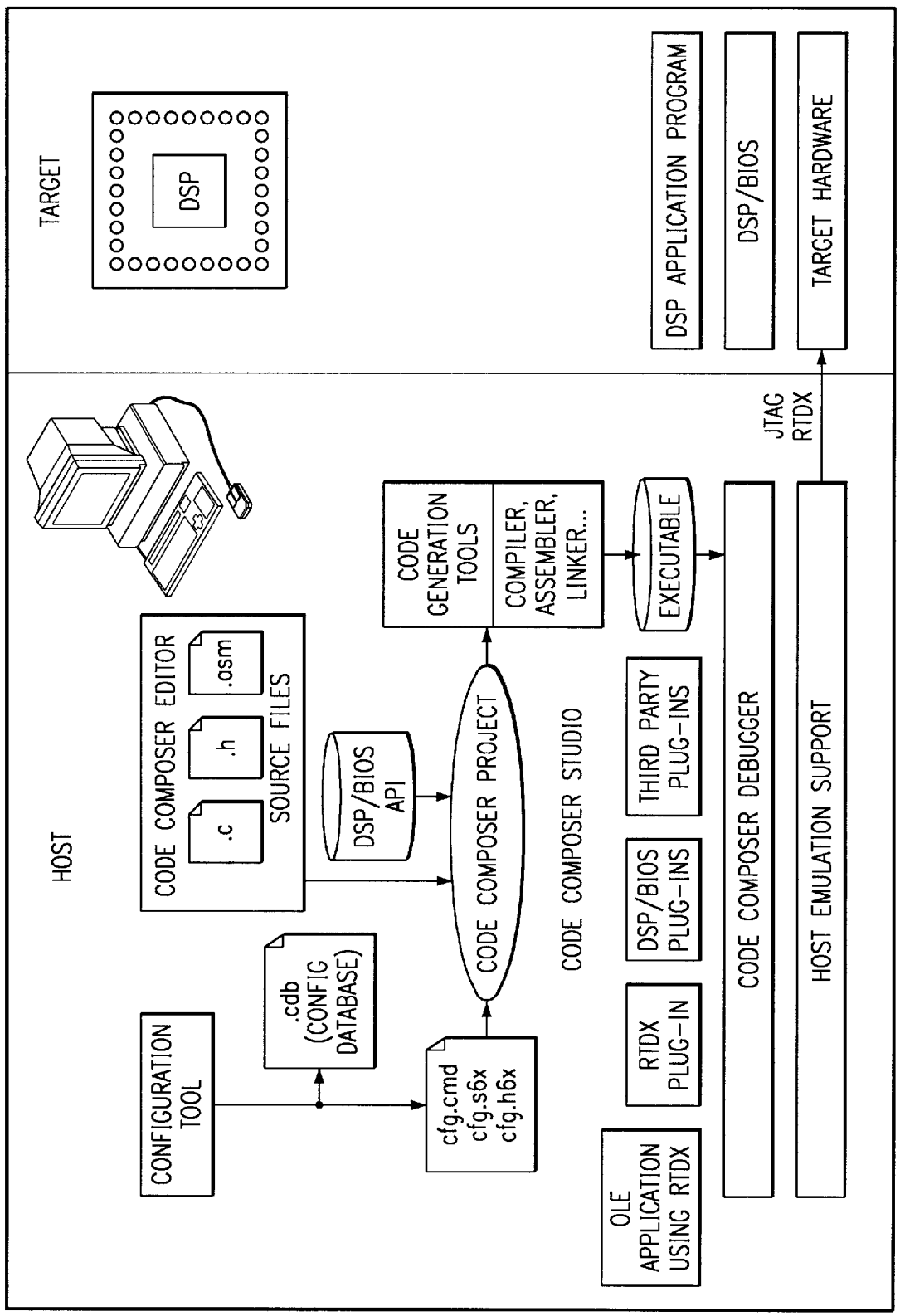
FIG. 2 is a block diagram illustrating components of the integrated development tool.

The integrated development tool includes the following components: DSP Code Generation Tools, Integrated Development Environment, DSP/BIOS plug-ins and API, and RTDX plug-ins, host interface, and API. These components work together as shown in FIG. 2.

Code Generation Tools

Figure 3:
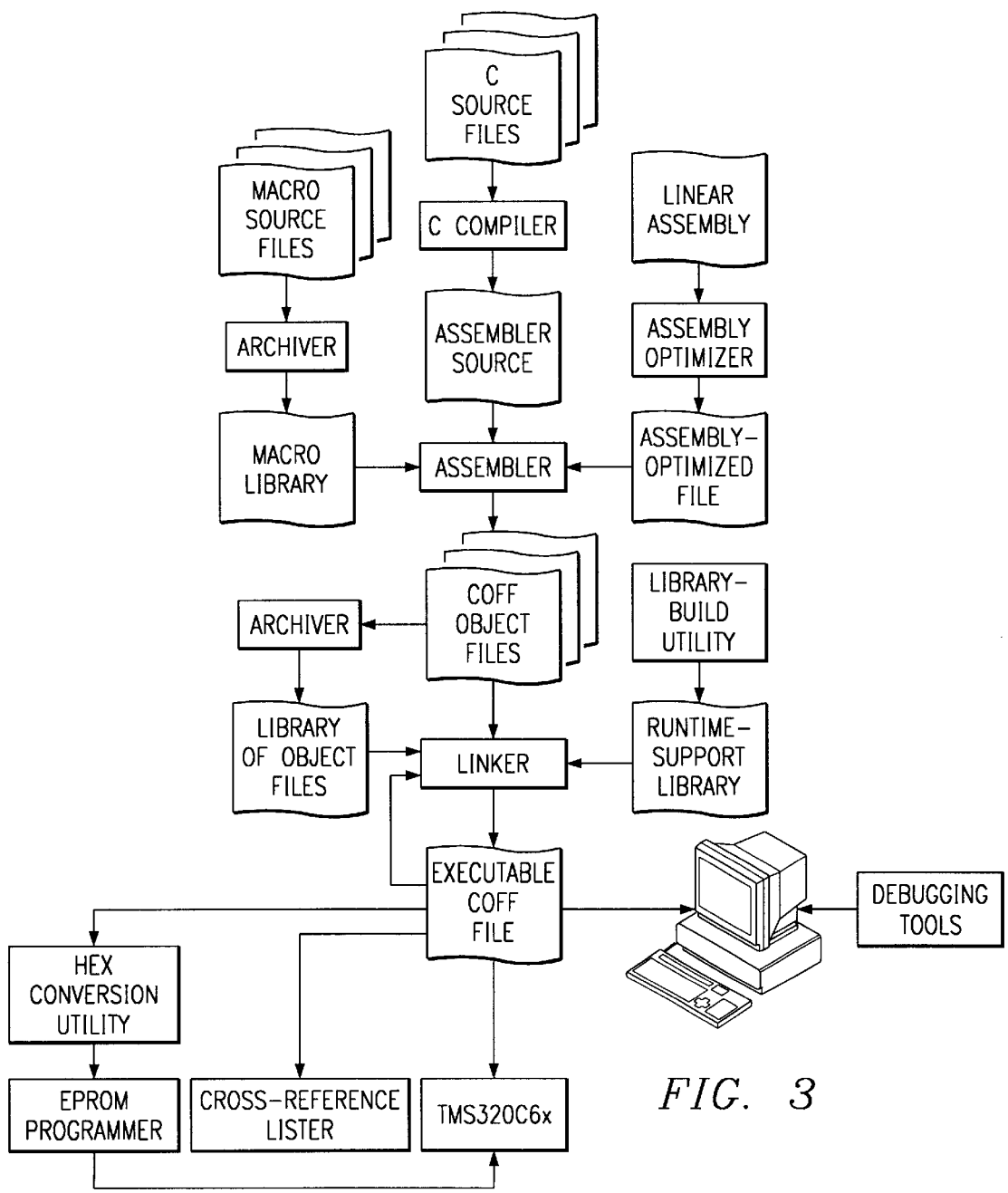
FIG. 3 shows a representative DSP software development flow.

The DSP code generation tools provide the foundation for the development environment provided by the integrated development tool. FIG. 3 shows a representative DSP software development flow. The most common software development path for C language programs is shaded. Other portions are peripheral functions that enhance the development process.

The following list describes the tools shown in FIG. 3. The C compiler accepts C source code and produces appropriate DSP assembly language source code. The assembler translates assembly language source files into machine language object files. The machine language is based on a common object file format (COFF). The assembly optimizer allows linear assembly code to be written without being concerned with the pipeline structure or with assigning registers. It assigns registers and uses loop optimization to turn linear assembly into highly parallel assembly that takes advantage of software pipelining. The linker combines object files into a single executable object module. As it creates the executable module, it performs relocation and resolves external references. The linker accepts relocatable COFF object files and object libraries as input. The archiver allows collection of a group of files into a single archive file, called a library. The archiver also allows modification of a library by deleting, replacing, extracting, or adding members. The library-build utility may be used to build a customized runtime-support library. The runtime-support libraries contain the ANSI standard runtime—support functions, compiler-utility functions, floating-point arithmetic functions, and C I/O functions that are supported by the compiler. The hex conversion utility converts a COFF object File into TI-Tagged. ASCII-hex, Intel. Motorola-S, or Tektronix object format. The converted file may be downloaded to an EPROM programmer. The cross-reference lister uses object files to produce a cross-reference listing showing symbols, their definitions, and their references in the linked source files.

Integrated Development Environment

The Integrated Development Environment (IDE) is designed to easily edit, build, and debug DSP target programs.

Editing Program Code

The IDE allows you to edit C and assembly source code. You can also view C source code with the equivalent assembly instructions shown after the C statements as depicted in FIG. 4. The integrated editor provides the following features: highlighting of keywords, comments, and strings in color; marking C blocks in parentheses and braces, finding matching or next parenthesis or brace; increasing and decreasing indentation level, customizable tab stops; find and replace in one or more files, find next and previous, quick search; multiple-action undo and redo; multiple windows and windows with split panes; and context-sensitive help.

Building Applications

Within the IDE, an application may be created by adding files to a project. The project file is used to build the application. Files in a project can include C source files, assembly source files, object files, libraries, linker command files, and include files as depicted in FIG. 5. An easy-to-use window allows specification of the options to use when compiling, assembling, and linking a project. Using a project, The IDE can create a full build, an incremental build, and can compile individual files. It can also scan files to build a dependency tree for the entire project.

Debugging Applications

The IDE supports the following program debugging features: breakpoints, with a number of stepping options: automatic updates at breakpoints; watched variables; view and edit memory and registers; view call stack; probe points for streaming data and memory snapshots to/from target; graphing of signals on target; profiling of execution statistics; and viewing of disassembled and C instructions executing on target.

DSP/BIOS Plug-ins and API

In addition to the familiar debugging features. The integrated development tool provides support for real-time program analysis. Developers can visually probe, trace, and monitor a DSP application as it runs with minimal impact on the application's real-time performance.

Figure 6:
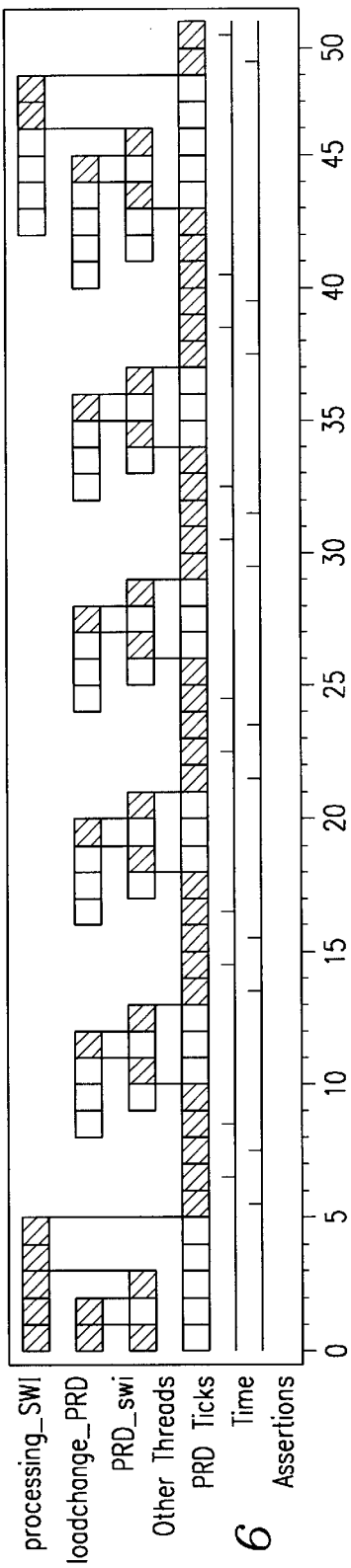
FIG. 6 is a time line illustrating real-time analysis features of the integrated development tool.

During the analysis phase of the software development cycle, traditional debugging features become ineffective for diagnosing subtle problems that arise from time-dependent interactions. The real-time analysis features of the integrated development tool are important during this development phase. The plug-ins provided with the DSP/BIOS API support real-time analysis as depicted in FIG. 6. Unlike traditional debugging, which is external to the executing program, these features require the target program to be linked with certain DSP/BIOS API modules.

The DSP/BIOS API provides the following real-time analysis capabilities: a) program tracing by displaying events written to target logs, and reflecting dynamic control flow during program execution; b) performance monitoring by tracking statistics that reflect utilization of target resources, such as processor load and thread timing; and c) file streaming by binding target-resident I/O objects to host files.

The DSP/BIOS API (C or assembly) also provides support for timing measurement, periodic execution of functions, and multi-priority threading and scheduling. These API calls are optimized for use on the target DSP.

In addition to adding DSP/BIOS API calls to a program, the Configuration Tool in the IDE environment may be used to create files that define objects used by the DSP/BIOS API. This also simplifies memory mapping and hardware ISR vector mapping.

Configuring Programs to Use DSP/BIOS

Figure 7:
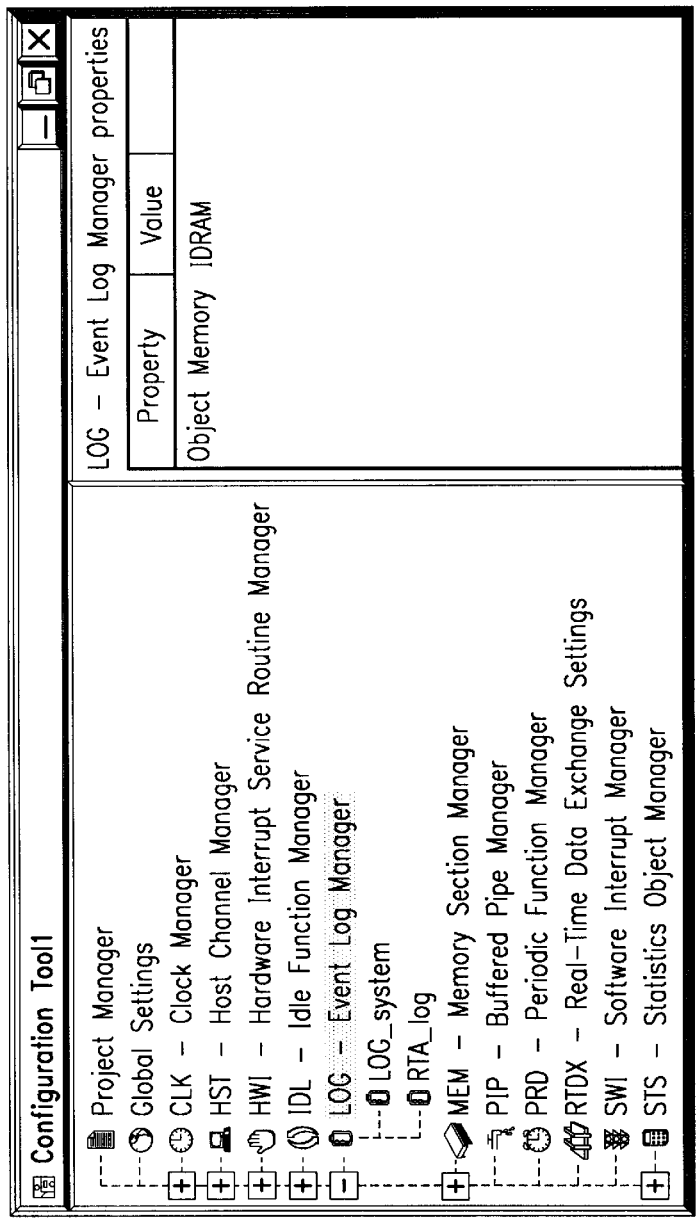
FIG. 7 represents a visual editor for creating and setting properties for run-time objects that will be used by the target application.

The Configuration Tool has two roles: it sets parameters used by the DSP/BIOS API at run-time, it serves as a visual editor for creating and setting properties for run-time objects that will be used by the target application's DSP/BIOS API calls. These objects include software interrupts, I/O streams, event logs, and more as depicted in FIG. 7.

Unlike systems that create objects at run-time with API calls that require extra target overhead (especially code space), all DSP/BIOS objects are statically configured and bound into an executable program image. In addition to minimizing the target memory footprint by eliminating run-time code and optimizing internal data structures, this static configuration strategy detects errors earlier by validating object properties before program execution. The Configuration Tool generates several files that will be linked with the code written.

DSP/BIOS API Modules

A program can use one or more of the DSP/BIOS modules as desired. A separate C header file or assembly-macro file for each module allows minimization of the program size overhead in a program that uses DSP/BIOS. The IDE may be used to assemble, compile, and link programs that use the DSP/BIOS API, just as for programs that do not use DSP/BIOS.

The DSP/BIOS API is divided into the modules indicated in Table 1. All the operations within a module begin with the three-letter codes shown here.

TABLE 1

DSP/BIOS modules

| | |
|---|---|
| CLK: | The on-chip timer module controls the on-chip timer and provides a logical 32-bit real-time clock with a high-resolution interrupt rate as short as a single instruction cycle and a low-resolution interrupt rate as long as several milliseconds or longer. |
| HST: | The host input/output module manages "host channel objects," which allow an application to stream data between the target and the host. Host channels are statically configured for input or output. |

TABLE 1-continued

DSP/BIOS modules

| | |
|---|---|
| HWI: | The hardware interrupt module provides support for hardware interrupt routines. In the Configuration Tool, functions that will run when hardware interrupts occur can be assigned. |
| IDL: | The idle function module manages "idle functions," which are run in a loop when the target program has no higher priority tasks to perform. |
| LOG: | The log module manages LOG objects, which capture events in real-time while the target program executes. System logs may be used or user-defined logs may be created. Messages in these logs may be viewed in real-time with The integrated development tool. |
| MEM: | The memory module allows specification of the memory segments required to locate the various code and data sections of a target program. |
| PIP: | The data pipe module manages data pipes, which are used to buffer streams of input and output data. These data pipes provide a consistent software data structure to drive I/O between the DSP chip and all kinds of real-time peripheral devices. |
| PRD: | The periodic function module manages periodic objects, which trigger periodic execution of program functions. The period of these objects can be controlled by the clock rate maintained by the CLK module or by regular calls to PRID-tick, usually in response to hardware interrupts from peripherals that produce or consume streams of data. |
| RTDX: | Real-time data exchange manager. |
| STS: | The statistics module manages "statistics accumulators," which store key statistics while a program runs. You can view these statistics in real-time with The integrated development tool. |
| SWI: | The software interrupt module manages "software interrupts," which are patterned after hardware interrupt service routines (ISRs). When a target program posts an SWI object with an API call, the SWI module schedules execution of the corresponding function. Software interrupts can have up to 15 priority levels; all levels are below the priority level of hardware ISRs. |
| TRC: | The trace module manages a set of trace control bits which control the real-time capture of program information through event logs and statistics accumulators. |

Real-Time Data Exchange (RTDX) Host Interface

In addition to the RTDX API module, RTDX includes a host interface and the IDE plug-ins that allow you to use display and analyze data sent from the target to the host with the RTDX API. You can also use Visual Basic to format and customize the display of data obtained through RTDX.

Third-Party Plug-ins

Third-party software providers can create ActiveX and Wizards plug-ins that complement the functionality of The integrated development tool. A number of third-party plug-ins arc available for a variety of purposes.

The IDE also provides the Go DSP extension language (GEL) language, which allows adding functions to the IDE menus for commonly performed tasks.

Integrated Development Tool Files and Variables

The following sections provide an overview of the folders that contain the integrated development tool files, the types of files you will be using, and environment variables used by the integrated development tool. The installation process creates the subfolders shown in Table 2 within the installation folder where the integrated development tool is installed as depicted in FIG. 8:

TABLE 2

Subfolders bin-Contains various utility programs.
cxxxx\bios-Contains files used when building programs that use the DSP/BIOS API (where cxxx represents a specific DSP numerical designation).

TABLE 2-continued

Subfolders cxxxx\cc-Contains chip-specific files used by the IDE.
cxxxx\ctools-Contains software development tools.
cxxxx\docs-Contains files for online help and user guides.
cxxxx\drivers-Contains files for various DSP board drivers.
cxxxx\rtdx-Contains files for use with RTDX.
cxxxx\tutorial-Contains the examples.
ccs\bin-Contains program files for the the IDE.
ccs\gel-Contains GEL files for use with the IDE.
ccs\plugins-Contains plug-ins for use with the IDE.

While using The integrated development tool, files have the file name formats listed in Table 3

TABLE 3

File name formats project.mak-project file used by the IDE to define a project and build a program
program.c-C program source file(s)
program.asm-assembly program source file(s)
filename.h-header files for C programs, including header files for DSP/BIOS API modules
filename.lib-library files
project.cmd-linker command files
program.obj-object files compiled or assembled from source files.
program.out-an executable program for the DSP target (fully compiled, assembled, and linked).
This program may be loaded and run with the IDE.
project.wks-workspace file used by the IDE to store information about environment settings
program.cdb-configuration files created by the Configuration Tool in The integrated development tool. These files are used to create or modify DSP/BIOS objects and their properties. The following files are also generated when a configuration file is saved for a TMS320C6000 DSP.
programcfg.cmd-linker command file
programcfg.h6x-header file
programcfg.s6x-assembly source file The installation procedure defines the variables illustrated in Table 4 in the autoexec.bat file (for Windows 95 and 98) or as environment variables (for Windows NT).

TABLE 4

Installation procedure variables

Variable Description
TI-DIR     The folder where the integrated development tool is installed
           The default is c:\ti
A-DIR      A list of folders used to find files when compiling C source files
C-DIR      A list of folders used to find files when assembling source files
C6X_LIBS   A list of folders that contain library files used when compiling source files for a C6000.
C6X_INCS   A list of folders that contain include files used when compiling and assembling source files for a C6000.
PATH       Adds TI_DIR\bin and TI_DIR\c6OOO\ctools\bin to the PATH definition.
TPIDLL6X   Points to a DLL file needed by the IDE.

For Windows 95, the DOS shell's environment space may need to be increased to support the environment variables required to build the integrated development tool applications, and to use the gmake makefiles provided with the examples. This may be accomplished by right-clicking the shortcut used to open MS-DOS Prompt windows. Choose Properties from the pop-up menu. Go to the Memory tab and set the Initial Environment to 1024 or greater. Or, add the following line to the config.sys file and then restart the computer:

shell=c:\windows\command.com /e:4096 /p

A process of creating a simple test program that displays a "hello world" message will now be described. The example will be expanded by showing how to use DSP/BIOS to optimize this program. The main purpose of this example is to introduce the integrated development tool and to show the process used to create, build, and test programs, The source code is already stored online.

Troubleshooting Hint: If an error occurs when the IDE is started that says it can't initialize the target DSP, choose the Debug—>Reset DSP menu item. If this does not correct the problem, run a reset utility provided with a target board.

Begin by creating a project with the IDE and adding source code files and libraries to that project. In this example, standard C library functions will be used to display a "hello world" message.

1) Create a folder to contain, files to be modified. Copy all the files from the c:\ti\c6000\tutorial\heliol folder (or the corresponding subfolder for the location where the integrated development tool has been installed) to this new folder.
2) From the Windows Start menu. choose Programs—>DSP—>IDE.
3) Choose the Project—>New menu item.
4) In the Save New Project As window, select the working folder created. Type "myhello" as the project name and click Save.
5) Choose the Project-Add Files to Project menu item. Select the hello.c file and click Open.
6) Choose the Project-Add Files to Project menu item three more times to add the following files:
   vectors.asm: This file contains assembly instructions needed to set the RESET interrupt service fetch packets (ISFPs) to branch to the program's C entry point, c-intOO. (For more complex programs, additional interrupt vectors can be defined in vectors.asm, or DSP/BIOS may be used to define all the interrupt vectors automatically.)
   hello.cmd: Select "Linker Command File (*.cmd)" in the "Files of type" box to see this file listed. This file maps sections to memory.
   rts6201.lib: Select "Library Files (*.Iib)" in the "Files of type" box. Move to the compiler library folder (C:\ti\c6000\ctools\lib) to see this file listed. This library provides run-time support for the target IDSP, When building the program, the IDE will find this file because it searches for project files in the following path order.
   i) The folder that contains the source file.
   ii) The folders listed in the Include Search Path for the compiler or assembler options (from left to right).
   iii) The folders listed in the definitions the C-DIR (compiler) and A.DIR (assembler) environment variables (from left to right). The C-DIR environment variable defined by the installation points to the folder that contains the rts6201.lib file.
7) Expand the Project list by clicking the "+" signs next to Project, IIELLONAK, Libraries, and Source. This list is called the Project View.

To Review the code, double-click on the hello.c file in the Project View. You will see the source code in the right half of the window. You may want to make the window larger so that you clan see more of the source code at once. The source code is illustrated in Table 5

When FILE I/O is undefined, this is a simple program that uses the standard puts( ) function to display a "hello world!"

message. When FILE I/O is defined, this program prompts for a string and prints it to a file. It then reads the string from the file and prints it and a message about its length to standard output.

TABLE 5

Source code for hello.c

```
/* ======== hello.c
#include <stdio.h>
#define BUFSIZE 30
struct PARMS
int Beta;
int EchoPower;
int ErrorPower;
int Ratio;
struct PARMS *Link:
/* ======== main
void main()
{
int        i;
char       scanStr[BUFSIZE];
char       fileStr[BUFSIZE];
size_t     readSize:
FILE       *fptr;
struct PARMS str{
2934,
9432,
213,
9432,
&str
};
puts(Hhello world!\n");
#ifdef FILE I/O
/* clear char arrays */
for (i = 0; i < BUFSIZE; i++) {
scanStr[i3 = 0;
fileStr[i] = 0;
}
/* read a string from stdio */
scanf(11%s", scanStr);
/* open a file on the host and write char array */
fptr = fopen("file.txt", "w");
fprintf(fptr, "As", scanStr);
fclose(fptr);
open a file on the host and read char array */
fptr = fopen("file.txt", "r");
fseek(fptr, OL, SEEK-SET);
readSize = fread(fileStr, sizeof(char), BUFSIZE, fptr);
printf("Read a %d byte char array; %s\n", readSize, fileStr);
fclose(fptr);
#endif
}
```

The code in vectors.asm and hello.cmd may be examined by double-clicking on those files.

The IDE automatically saves changes to the project setup as you make them. If you exited from the IDE, you can return to the point where you stopped working by restarting the IDE and using the Project->Open menu item. To build and run the program. perform the following steps:

1) Choose the Project-->Rebuild All menu item or click the (Rebuild All) toolbar button. The IDE will recompile, reassemble, and relink all the files in the project. Messages about this process are shown at the bottom of the window.

2) Choose the File->Load Program menu item. Select the program you just rebuilt. myhello.out, and click Open. The IDE will load the program onto the target DSP and open a dis-assembly window that shows the disassembled instructions that make up the program.
   Notice that the IDE automatically opens a tabbed area at the bottom of the window to show output the program will send to stdout. Choose the Debug--> Run Program menu item or click the (Run) toolbar button. You will see the "hello world!" message in the stdout tab. Click (Halt) or press Shift F5 to stop the program.

In the previous section, the portion of the program enclosed by the preprocessor commands (#ifdef and #endif) did not run because FILE10 was undefined. In this section, you'll learn to change program options by setting preprocessor and compilation options with the IDE.

1. Choose the Project->Options menu item.
2. In the Compiler tab, type FILE10 in the Define Symbols box. Notice that when you tab out of this field, the compiler command line at the top of the window changes to include the -d option. The code after the #ifdef FILE10 statement in the program will now be included when you recompile the program.
3. Click OK to save your new option settings.
4. Choose the Project->Rebuild All menu item or click the (Rebuild All) toolbar button. The IDE needs to rebuild all the files because the project options have changed.

Using Breakpoints and the Watch Window will now be described.

1. Choose the File-->Reload Program menu item.
2. Double-click on the hello.c file in the Project View. You may want to make the window larger so that you can see more of the source code at once.
3. Put your cursor in the line that says: fprintf(fptr. 11%sll, scanStr);
4. Click the (Toggle Breakpoint) toolbar button or press F9. The line will be highlighted in magenta. (You can change this color using the Option-->Color menu item.)
5. Choose the View->Watch Window menu item. You will see a separate area in the lower-right corner of the the IDE window. This area will show the values of watched variables at run-time.
6. Right-click on the Watch Window area and choose Insert New Expression from the pop-up list.
7. Type *scanStr as the Expression and click OK
8. Choose Insert New Expression from the pop-up list again. This time, type *fileStr as the Expression and click OK Both of the expressions you typed will be listed in the Watch Window. Currently, the expressions are undefined because the program is not running the main( ) function within which these variables are declared locally.
9. Choose the Debug->Run Program menu item or press F5.
10. You will be prompted to enter input for the call to scanf( ). Type any text and click OK Notice that the stdout tab shows the input text in blue. Also notice that the Watch Window now shows the value of *scanStr.
11. After you provide the input string, the program will run to the line where you set a breakpoint and stop. The next line to be executed will be highlighted in yellow.
12. Click the (Step Over) toolbar button or press F1 0 to step over the call to fprintf( ). You can use these step commands:
    Step Into (F8): Steps through a single C or assembly instruction. If the instruction calls a function, steps into the function.
    Step Over (F10): Steps through a single instruction. If the instruction calls a function, executes the function to completion unless a breakpoint is encountered. Stops after the function call.

Step Out (Shift F7): Completes execution of a function and stops after the current function returns to the calling function.

Run to Cursor (Ctrl F1 0): Runs up to the current cursor position in the source file or disassembly window.

Run (F5): Runs until a breakpoint is encountered.

13. Experiment with these step commands. Click (Run) or press F5 to finish running the program when you have finished experimenting.
14. Right-click on the Watch Window and choose Hide from the pop-up menu to hide the window.
15. Click (Halt) or press Shift F5 to stop the program.
16. Choose the Debug->Breakpoints menu item. In the Breakpoints tab, click Delete All and then click OK.

The Watch Window can be used with Structures.

1. Right-click on the Watch Window area and choose Insert New Expression from the pop-up list.
2. Type str as the Expression and click OK You will see a line in the Watch Window that says "+str=( . . . I". The "+" sign indicates that this is a structure. Recall that a structure of type PARAMS was declared and initialized in hello.c.
3. Click once on the "+" sign. The IDE will expand this line to list all the elements of the structure and their values.
4. Double-click on any element in the structure to open the Edit Variable window for that element.
5. Change the value of the variable and click OK Notice that the value changes in the Watch Window.

Code execution time can be profiled. Later herein the DSP/BIOS API is used to display the "hello world!" message. In order to compare the standard putso function to the DSP/BIOS API, let's use the profiling features of the IDE.

1. Choose the File->Reload Program menu item.
2. Choose the Profiler->Enable Clock menu item. You will see a check mark next to this item in the Profiler menu. This clock counts instruction cycles. It must be enabled for profile-points to count instruction cycles.
3. Double-click on the hello.c file in the Project View.
4. Choose the View->Mixed Source/ASM menu item. You will see assembly instructions listed in gray after the equivalent C source code line.
5. Put your cursor in the line that says: puts("hello world!\n");
6. Click the (Toggle Profile-point) toolbar button. The C source code line and the first assembly instruction will be highlighted in green.
7. Scroll down and put your cursor in the line that says:
8. Click the (Toggle Profile-point) toolbar button. Profile-points are handled before the profile-point line is executed. They report the number of instruction cycles since the previous profile-point or since the program started running. So, the statistics for the second profile-point will report the number of cycles from when puts( ) started executing until it finished executing.
9. Choose the Profiler->View Statistics menu item. This opens an area at the bottom of the window that will display statistics about the profile-points. You can resize this area by dragging the boundaries between it and other areas of the window.
10. Click the (Run) toolbar button or press F5 to run the program.
11. Notice the number of cycles shown for the second profile-point. It should be about 2000 cycles. This is the number of cycles required to execute the call to puts( ). The average, total, maximum, and minimum are the same for these profile-points because these instructions are executed only one time.
12. Click (Halt) or press Shift F5 to stop the program.

Note: The IDE temporarily halts the target whenever it reaches a profile-point. Therefore, the target application may not be able to meet real-time deadlines when you are using profile-points.

Testing Algorithms and Canned Data

In this example, a simple algorithm is created and tested using canned data. This example will use probe-points, graphs, animation, and GEL files with the IDE. The files used in this example are:

volume.c: This is the source code for the main program. We'll examine the source code in the next section.

volume.h: This is a header file included by volumex to define various constants and structures.

load.asm: This file contains the load routine, a simple assembly loop routine that is callable from C with one argument. It consumes (9*argumeno+18 instruction cycles. vectors.asm: This is the same file used in the previous chapter to define a "reset" entry point in the DSPs interrupt vector table.

volume.cmd: This linker command file maps sections to memory.

rts6201.lib: This library provides run-time support for the target IDSR

The source code is reviewed by Double-clicking on the volume.c file in the Project View to see the source code in the right half of the IDE window, which is illustrated in Table 6

TABLE 6

Source Code example

```
#include <stdio.h>
#include "volume.h"
/* Global declarations
int inp_buffer[BUFSIZE];/* processing data buffers
int out-buffer[BUFSIZE]:
int gain = MINGAIN;/* volume control variable
unsigned int processing Load = BASELOAD:/* processing load
/* Functions */ extern void load(unsigned int loadValue);
static int processing(int *input, int
*output); static void dataIO(voia);
/* ======== main void maino
int *input = &inp_~buffer[O]; int *output = &out-buffer[O];
puts(l'volume example started\n");
/* loop forever
while(TRUE)
/* Read using a probe-point connected to a host file. dataIO();
/* apply gain processing(input, output);
/* processing
• FUNCTION: apply signal processing transform to input signal.
• PARAMETERS: address of input and output buffers.
* RETURN VALUE: TRUE.
*/ static int processing(int *input, int *output)
int size = BUFSIZE;
while(size--){
*output++ = *input++ * gain;
/* additional processing load load(processingLoad);
return(TRUE);
/*              ======== dataIO ========
FUNCTION: read input signal and write output signal.
PARAMETERS: none.
RETURN VALUE: none.
static void dataIO()
/* do data I/O return;
```

Notice the following parts of this example:

1) After the main function prints a message, it enters an infinite loop. Within this loop, it calls the dataI0 and procession functions.

2) The data I/O function in this example does not perform any actions other than to return. Rather than using C code to perform I/0, you will be using a probe-point within the IDE to put data from a file on the host into the inp-buffer location.

3) The processing function multiplies each value in the input buffer by the gain and puts the resulting values into the output buffer. It also calls the assembly load routine, which consumes instruction cycles based on the processing load value passed to the routine.

Adding a "probe-point" that will read data from a file on a PC will now be described. How to see a run-time graphical view of input and output data will also be described. In a real program, you would typically read data from some peripheral device, instead. The chapters that follow will show other ways to manage input and output streams. Probe points can also be used to write data from memory to a file or to cause a window to be updated at a particular point in program execution.

1) Choose the Project-->Rebuild All menu item or click the (Rebuild All) toolbar button.
2) Choose the File-->Load Program menu item. Select the program you just rebuilt. volume.out, and click Open.
3) Double-click on the volume.c file in the Project View.
4) Put your cursor in the line that says: data I/O( );
   Recall that the data I/O function simply returns without performing any other actions. In this version of the volume program, you will need to use a probe-point to connect the call to data I/O to a data file.
5) Click the *(Toggle Probe-point) toolbar button. The line will be highlighted in blue. (You can change this color using the Option-->Color menu item.)
6) Choose the File-->File I/O menu item. You will see the File I/O dialog, which lets you select input and output files.
7) In the File Input tab, click Add File.
   Choose the sine6.dat file. Notice that you can select the format of the data in the Files of Type box. The sine6.dat file contains hex values for a sine waveform. Click Open to add this file to the list in the File I/O dialog. You will see a control window for the sine6.dat file. Later, when you run the program, you will be able to use this window to start, stop, rewind, or fast forward within the data file.
9) In the File I/O dialog, change the Address to inp-buffer and the Length to Ox64. Also. put a check mark in the Wrap Around box. The Address specifies where the data from the file is to be placed. The inp-buffer is declared in volumex as an integer array of BUFSIZE. The Length specified how many samples from the data file are to be read each time the probe-point is reached. You use Ox64 because that is the value set for the BUFSIZE constant in volume.h. The Wrap Around option causes the IDE to start reading from the beginning of the file when it reaches the end of the file. This allows the data file to be treated as a continuous stream of data even though it contains only 1000 values and 100 (Ox64 hex) values are read each time the probe-point is reached.
10) Click Add Probepoint. You will see the Probe-points tab of the Bread/ Probe/Profile Points dialog.
11) Highlight the probe-point you created in step 5 (on VOLUME.C line 60).
12) In the Connect To field, click the down-arrow and select the sine6.dat file from the list.
13) Click Replace. The probe-point will show that it is connected to the sine6.dat file.
14) Click OK The File I/O dialog will show that the file is now connected to a probe-point.
15) Click OK in the File I/O dialog.

Displaying Graphs

If you ran the program now, you wouldn't see much information about what the program was doing. You could set watch variables on addresses within the inp-buffer and out-buffer arrays, but you'd need to watch a lot of variables and the display would be numeric rather than visual. The IDE provides a way to graph signals being processed by your program. We'll open the graphs in this section and run the program in the next section.

1) Choose the View-->Graph-Time/Frequency menu item.
2) In the Graph Property Dialog, change the Graph Title, Start Address, Acquisition Buffer Size, Display Data Size, Autoscale, and Maximum Yvalue properties to the values shown here. You will need to scroll down or resize the dialog to see all the properties.
3) Click OK You will see a graph window for the Input Buffer.
4) Random data (the values stored on the target at these addresses) is shown in the graph initially. Right-click on the Input Buffer window and choose Clear Display from the pop-up menu.
5) Choose the View->Graph—Time/Frequency menu item again.
6) This time, change the Graph Title to "Output Buffer' and the Start Address to "out-buffer". All the other settings are correct.
7) Click OK to display the graph window for the Output Buffer.

Animating the Program and Graphs

The IDE can display a wide variety of graph types. In this example, you'll learn to view a signal plotted against time.

1) In the Volume.c window, put your cursor in the line that calls the dataI/0 function.
2) Click the (Toggle Breakpoint) toolbar button or press F9. The line will be highlighted in both magenta and blue to indicate that both a breakpoint and a probe-point are set on this line.
3) Arrange the windows so that you can see both graphs.
4) Click the (Animate) toolbar button or press F12.

The IDE will run the program. Each time the program reaches the breakpoint, it will update the probe-point by getting 100 (Ox64) values from the sine6.dat file and writing them to the inp-buffer address. The graph windows are automatically updated when the program reaches a breakpoint. Then, the program automatically runs to the next breakpoint.

The graph windows show the input signal and the output signal. At this point, the signals are identical. Notice that each buffer contains 2.5 sine waves and the signs are reversed in these graphs. This is because the input buffer contains the values just read from sine6.dat. while the output buffer contains the last set of values processed by the processing function. Note: The IDE temporarily halts the target whenever it reaches probe-point. Therefore, the target application may not be able to meet real-time deadlines when you are using probe-points.

Adjusting the Gain

1) Recall that the processing function performs the following statement within a while loop: *output++=

*input++* gain; This statement multiplies a value in inp-buffer by the gain and places it in the corresponding location in the out-buffer. The gain is initially set to MINGAIN, which is defined as 1 in volume.h. To modify the output, we need to change gain. One way to do this is to use a watch variable.

2) Choose the View-Match Window menu item.
3) Right-click on the Watch Window area and choose Insert New Expression from the pop-up list.
4) Type gain as the Expression and click OK. You will see the value of this variable in the Watch Window area.
5) Double-click on "gain" in the Watch Window area.
6) In the Edit Variable window, change the gain to 10 and click OK
7) If you have halted the program, click the (Animate) toolbar button.
8) Notice that the amplitude of the signal in the Output Buffer graph changes to reflect the increased gain.

Using a GEL File

The IDE provides another way of modifying a variable. This method uses GEL, a powerful extension language, to create small windows that allow you to modify variables.

1) Choose the File->Load GEL menu item. In the Open dialog, select the volume.gel file and click Open.
2) Choose the Tbols->GEL Functions->Application Control->Gain menu item. This item was added to your menus when you loaded the GEL file.
3) If you have halted the program, click the (Animate) toolbar button.
4) In the Gain window, use the slider to change the gain. You will see the amplitude change in the Output Buffer window. In addition, the value of the gain variable in the Watch Window area changes whenever you move the slider.

To see how the Gain GEL function works, click the 'Y' sign next to GEL Files in the Project View. Then, double-click on the VOLUME.GEL file to see its contents, is listed in Table 7

TABLE 7

Volume.GEL file menuitem "Application Control"
dialog Load(loadParm "Load")
{
processingLoad = loadParm;
}
ider Gain(O, 10 I, 1, gainParm)
{
gain = gainParm;
}

The Gain function defines a slider with a minimum value of 0, a maximum value of 10, and an increment and page up/down value of 1. When you move the slider, the gain variable is changed to the new value of the slider (gainParm). In the next section, we'll show how the Load GEL function works and learn more about profiling.

Adjusting and Profiling the Processing Load

In the previous chapter, we used profile-points to compare the number of cycles required to call puts and LOG-printf. Now, we will use profile-points to see the effect of changing the processingLoad variable, which is passed to the assembly load routine. The processingLoad is initially set to BASELOAD, which is defined as 1 in volume.h.

1) Choose the Prof iler->Enable Clock menu item. Make sure you see a check mark next to this item in the Profiler menu.
2) Double-click on the volume.c file in the Project View.
3) Choose the View-->Mixed Source/ASM menu item to view both the C source and the equivalent assembly instructions.
4) Scroll down to the processing function. Put your cursor in the assembly instruction after the line that says: load(processingLoad);
5) Click the (Toggle Profile-point) toolbar button.
6) Put your cursor in the assembly instruction after the line that says:
return(TRUE);
7) Click the (Toggle Profile-point) toolbar button.
Choose the Profiler->View Statistics menu item. You may want to resize the Statistics area so that you can see the Maximum column. Or, you can right-click on the Statistics area and choose Allow Docking to display the statistics in a separate window.
8) If you have halted the program, click the (Animate) toolbar button.
9) Notice the maximum number of cycles shown for the second profile-point. It should be about 27 cycles. This is the number of cycles required to execute the load routine when the processingLoad is 1.
10) Choose the Tools->GEL Functions-->Application Control->Load menu item. This item was added to your menus when you loaded the GEL file.
11) Type 2 as the new load and click Execute. Notice that the maximum number of cycles for the second profile-point changes to 36. The number of cycles increases by 9 when you increment the processingLoad by 1.
12) Right-click on the Profile Statistics area and choose Clear All from the pop-up menu. This resets the statistics to zero. The average, maximum, and minimum will all be equal to the number of cycles for the current processingLoad.
13) Click (Halt) or press Shift F5 to stop the program.

Testing Real-Time Execution

This example modifies the previous example to introduce real-time behavior. Rather than having a main loop forever, in the real application the data 10 is likely to happen as a result of an external interrupt that occurs periodically. A simple way to simulate such an external interrupt is to use the timer interrupt from the on-chip timer.

Viewing Task Execution with the System Log

While we could test the program by putting a probe-point within the processing function and view graphs of input and output data (as we did in the previous chapter), we have already tested the signal processing algorithm. At this stage of development, our focus is on making sure the tasks can meet their real-time deadlines.

Changing the Load

Using the System Log, we saw that our program meets its real-time deadlines. However, the signal processing functions in a typical program must perform more complex and cycle consuming tasks than multiplying a value and copying it to another buffer. We can simulate such complex tasks by increasing the cycles consumed by the load function.

Testing Real-Time Execution

Another example will now be described that uses RTDX (Real-Time Data Exchange) to make real-time changes to the target.

Added the following to the list of included header files:
Added the following to the declarations:
/* RTDX channels */
RTDX-input-channel control-channel=10);
Void loadchange(Void);

Added the following call to the main function:
RTDX-enableInput(&control_channel);
Add the function illustrated in Table 9, which will be called by the PRID object you created in the previous section.

TABLE 8

RTDX Function

```
/* ======== loadchange ========
FUNCTION: Called by loadchange-PRD to update load value.
PARAMETERS: none.
RETURN VALUE: none.
Void loadchangeo static Int control = MINCONTROL;
/* Read new load control when host sends it if
(!RTDX_channelBusy(&control - channel))
RTDX-readNB(&control_channel, &control,
sizeof(control));
if((control < MINCONTROL)||(control > MAXCONTROL))
LOG_printf(&trace,"Control value out of range");
else f
processingLoad = BASELOAD << control;
LOG_printf(&trace,"Load value = %d",processingLoad);
```

This function uses RTDX API functions to change the load of the processing signal in "real-time". Notice the following aspects of these changes:

The call to the RTDX—enableInput function initializes a buffer to receive data. This buffer will be filled by a Visual Basic application that writes a load value to the buffer at run-time.

The call to the RTDX—readNB function reads the data in the buffer into the control variable.

The processingLoad=BASELOAD<<control; statement shifts the bits in BASELOAD (1) to the left by the number of digits specified by the load. Because MAX-CONTROL is set to 31, the RTDX control will allow you to set an exponentially scaled value for the load up to the maximum value that can be stored in a 32-bit variable.

While we could test the program by putting a probe-point within the processing function and view graphs of input and output data (as we did in an earlier chapter), we have already tested the signal processing algorithm. At this stage of development, our focus is on making sure the tasks we've added can still meet their real-time deadlines.

1) Choose the File->Load Program menu item. Select the program you just rebuilt, volume.out, and click Open.

2) Choose the Tools->ActiveX plugins-->RTDX menu item.

3) Click Configure in the RTDX area of the window. In the General Settings tab of the RTDX Properties dialog, select Continuous RTDX mode. Then, click OK. Continuous mode allows ongoing data exchange across the channel. (Non-continuous mode allows you to write data from the target to a log file.)

4) Change "RTDX Disable" to "RTDX enable" in the RTDX area.

5) Using the Windows Explorer, run loadcrti.exe. You will see the Load Control window.

Break Points and Probe Points

The use of breakpoints to control the execution of a program and how to set probe points for signal analysis will now be described in more detail. Breakpoints are used to stop execution of the program. Once stopped, you can examine the state of your program, examine or modify variables, examine the call stack, and so on. Once the breakpoint is set, it can be enabled or disabled. Using the breakpoint button on the toolbar is the easiest way to set and clear breakpoints at any location in the program. The breakpoint dialog box allows you to set more complex breakpoints, such as conditional breakpoints, or hardware breakpoints.

To set a breakpoint using the toolbar:
1. Move the cursor to the line where you want to set the breakpoint. You can set a breakpoint in either a disassembly or C source window.
2. Click on the breakpoint button on the toolbar. Once set, the line is highlighted.

To remove a breakpoint using the toolbar: Move the cursor to the line containing the breakpoint. Click on the Breakpoint button on the toolbar.

To add a breakpoint using the breakpoint dialog box:
1. From the menu item, choose the DEBUG-BREAKPOINTS command.
2. Choose whether you want to "Break at location" (unconditionally) or if you want to "Break at location if expression is TRUE" (conditionally).
3. Enter the location at which you want to set the breakpoint.
   A. For an absolute address, you can enter any valid C expression, the name of a C function, or a symbol name.
   B. You can also enter a breakpoint location based on your C source file. This is convenient when you do not know where the C instruction will end up in the executable. The format for entering in a location based on the C source file is as follows: fileName line lineNumber
4. If you have selected a conditional breakpoint in step 2, then you must enter the condition in the Expression field.
5. Press the ADD button to create a new breakpoint. This will then cause a new breakpoint to be created and enabled.
6. Press the OK button to close the window.

To change an existing breakpoint:
1. From the menu, choose the DEBUG-BREAKPOINTS command.
2. Select a breakpoint in the breakpoint list. The selected breakpoint will become highlighted and the Type, Location, and Expression fields will be updated to match the selected breakpoint.
3. Edit the breakpoint Type, Location, and/or Expression fields as required.
4. Press the REPLACE button to change the currently selected breakpoint.
5. Press the OK button to close the window.

To delete an existing breakpoint:
1. From the menu, choose the DEBUG-BREAKPOINTS command.
2. Select a breakpoint in the breakpoint list.
3. Press the DELETE button to deleted the breakpoint.
4. Press the OK button to close the window.

To delete all breakpoints using the breakpoint dialog box:
1. From the menu, choose the DEBUG-BREAKPOINTS command.
2. Press the DELETE ALL button.
3. Press the OK button to close the window.

Once a breakpoint is set, it can be disabled or enabled. Disabling a breakpoint provides a quick way of suspending its operation temporarily, while retaining the location and type of the breakpoint.

To enable a breakpoint:
1. From the menu, choose the DEBUG-BREAKPOINTS command. This will open the breakpoint dialog box which lists all the breakpoints.
2. Select the breakpoint you wish to enable from the list. The breakpoint should have a cross beside it indicating that it is currently disabled.
3. Press the ENABLE button. This will change the cross to a check mark, indicating that the breakpoint is now enabled.
4. Press the OK button to close the window.

To disable a breakpoint:
1. From the menu, choose the DEBUG-BREAKPOINTS command. This will open the breakpoint dialog box which lists all the breakpoints.
2. Select the breakpoint you wish to disable from the list. The breakpoint should have a check mark beside it indicating that it is currently enabled.
3. Press the ENABLE button. This will change the check mark to a cross, indicating that the breakpoint is now enabled.
4. Press the OK button to close the window.

To enable all breakpoints:
1. From the menu, choose the DEBUG-BREAKPOINTS command. This will open the breakpoint dialog box which lists all the breakpoints.
2. Press the ENABLE ALL button. This button allows you to quickly enable all breakpoints in the breakpoint list.
3. Press the OK button to close the window.

To disable all breakpoints:
1. From the menu, choose the DEBUG-BREAKPOINTS command. This will open the breakpoint dialog box which lists all the breakpoints.
2. Press the DISABLE ALL button. This button allows you to quickly disable all breakpoints in the breakpoint list.
3. Press the OK button to close the window.

Conditional Breakpoints

Every conditional breakpoint has its own conditional expression. When the location of the conditional breakpoint is reached, the expression is evaluated. If the result of the expression is false, the processor will resume execution without updating the display; otherwise, the display will be updated as if a traditional breakpoint was hit.

User-defined GEL (GO DSP Extension Language) files can also be "connected" to provide necessary conditions that need to be satisfied in order for the particular breakpoint to be enabled. The user-defined GEL file can be placed in the "Expression" dialog box inside the Breakpoint manager window. This will ensure that the breakpoint will only be enabled provided a user-defined condition (as defined by a GEL file) is met. Warning: the target processor is halted while the expression is evaluated by the host. Therefore, the target application may not be able to meet real-time constraints with conditional breakpoints set.

Hardware Breakpoints

Hardware breakpoints differ from software breakpoints in that they do not modify the target program. Hardware breakpoints are useful for setting breakpoints in ROM memory or breaking on memory accesses instead of instruction acquisitions. The on-chip analysis capabilities of the TMS320C5x and TMS320C4x processors have support for one H/W breakpoint per address bus (i.e. program/data or DMA). A breakpoint can be set for a particular memory read, memory write, or memory read or write. Memory access breakpoints are not shown in the source or memory window displays.

Hardware breakpoints can also have a Count which determines the number of times a location is encountered before a breakpoint is generated. If the Count is one, a breakpoint is generated every time.

To Add a Hardware Breakpoint:
1. From the menu, choose the DEBUG-BREAKPOINTS command.
2. For the Breakpoint Type, choose "H/W Break at location" for an instruction acquisition breakpoints, or choose "break on <bus><Read/Write/R/w> at location" for a memory access breakpoint.
3. Enter the program location at which you want to set the breakpoint, or the memory location whose access you wish to break on.
    A. For an absolute address, you can enter any valid C expression, the name of a C function, or a symbol name.
    B. You can also enter a breakpoint location based on your C source file. This is convenient when you do not know where the C instruction will end up in the executable. The format for entering in a location based on the C source file is as follows:fileName at line lineNumber
4. Enter the number of times the location is hit before a breakpoint is generated, in the Count field. Set the count to I if you wish to break every time.
5. Press the ADD button to create a new breakpoint. This will then cause a new breakpoint to be created and enabled.
6. Press the OK button to close the window.

Probe Points

Probe Points allow the update of a particular window or the reading/writing of samples from a file to occur at a specific point in your algorithm. This effectively "connects a signal probe" to that point in your algorithm. Once the probe point is set, it can be enabled or disabled just like breakpoints. When a window object is created, it assumes that it is to be updated at every breakpoint. However, this attribute can be changed and the window can be updated only when the program reaches the connected probe point. Once the window is updated, execution of the program is continued.

With the combination of the IDE's File 1/0 capabilities, probe points can also be used to connect streams of data to a particular point in the DSP code. When the probe point is reached in the algorithm, data is streamed from a specific memory area to file, or from the file to memory. See FILE 1/0 for more details. The target processor is temporarily halted by the host processor when a probe point is encountered. Therefore, the target application may not be able to meet real-time constraints when using probe points.

To Add a Probe Point: Probe points can be created by simply placing the cursor on the line, in a source file or dis-assembly window, where you want the probe point to be, and clicking the Probe Point short-cut key on the tool bar. To be useful, probe points must be connected to a window or file (see Connecting Probe Points for more details). The DEBUG-PROBE POINTS menu command allows you to set more complex probe points, such as conditional probe points, or hardware probe points.

To delete an existing probe point:
1. From the menu, choose the DEBUG-PROBE POINTS command.

2. Select a probe point in the probe point list.
3. Press the DELETE button to delete the probe point.
4. Press the OK button to close the window.

To delete all probe points using the probe point dialog box:
1. From the menu, choose the DEBUG-PROBE POINTS command.
2. Press the DELETE ALL button.
3. Press the OK button to close the window.

To delete all probe points using the toolbar: From the toolbar, select the Delete All Probe "Points" button.

Connecting Probe Points

To connect a display window to a probe point:
1. Ensure that you have created the window which you want connected. Create the Probe Point. This can be done by first placing the cursor on the line where you want the probe point set and then clicking on the Probe Point shortcut key on the tool bar.
2. Select the command DEBUG-PROBE POINTS in the menu bar. In the list of Probe Points, you should see the new probe point that you have created. This probe point should indicate it currently has "No Connection".
   ✓ echocan.c line 191 -->No Connection
3. Select this probe point to make it current. You can now edit its fields in the Probe Points dialog box.
4. Select the type of probe point: you want it to be. The default is unconditional. That is, every time the execution of the code reaches the probe point, its connected file or window is updated; execution of the code is then continued after the update. You can change the probe point to a conditional probe point, to activate the probe only if the expression is evaluated to be true.
5. Enter the location at which you want to set the probe point. If you had executed Step 2, then this field will have already been filled with the appropriate value.
   A. For an absolute address, you can enter any valid C expression, the name of a C function, or the name of an assembly language label.
   B. You can also enter a probe point location based on your C source file. This is convenient when you do not know where the C instruction will end up.in the executable. The format for entering in a location based on the C source file is as follows: fileName at line lineNumber
6. If you had selected a conditional probe point in step 4, then you must enter the condition in the Expression field.
7. You must now connect the window or file to the probe point. The Connect To drop down list contains all the files and windows that can be connected to the probe point. From this list select the appropriate item.
8. Once all values have been filled press the ADD button to create a new probe point or you can simply press the REPLACE button to modify the existing probe point.

Enabling and Disabling Probe Points

Once a probe point is set, it can be disabled or enabled. Disabling a probe point provides a quick way of suspending its operation temporarily, while retaining the location and type of the probe point. Warning: Windows connected to probe points that are disabled will never be updated To enable a probe point:
1. From the menu, choose the DEBUG-PROBE POINTS command. This will open the probe point dialog box which lists all the probe points.
2. Select the probe point you wish to enable from the list. The probe point should have a cross beside it indicating that it is currently disabled.
3. Press the ENABLE button. This will change the cross to a check mark, indicating that the probe point is now enabled.
4. Press the OK button to close the window.
   Shortcut: You can toggle a probe point between enabled and disabled by simply double clicking on any probe point in the list with the left mouse button.

To disable a probe point:
1. From the menu, choose the DEBUG-PROBE POINTS command. This will open the probe point dialog box which lists all the probe points.
2. Select the probe point you wish to disable from the list. The probe point should have a check mark beside it indicating that it is currently enabled.
3. Press the ENABLE button. This will change the check mark to a cross, indicating that the probe point is now enabled.
4. Press the OK button to close the window.
   Shortcut: You can toggle a probe point between enabled and disabled by simply double clicking on the probe point in the list with the left mouse button.

To enable all probe points:
1. From the menu, choose the DEBUG-PROBE POINTS command. This will open the probe point dialog box which lists all the probe points.
2. Press the ENABLE ALL button. This button allows you to quickly enable all probe points in the probe point list.
3. Press the OK button to close the window.

To disable all probe points:
1. From the menu, choose the DEBUG-PROBE POINTS command. This will open the probe point dialog box which lists all the probe points.
2. Press the DISABLE ALL button. This button allows you to quickly disable all probe points in the probe point list.
3. Press the OK button to close the window.

Conditional Probe Points

Every conditional probe point has its own conditional expression. When the location of the conditional probe point is reached, the expression is evaluated. If the result of the expression is false, the processor will resume execution as if no probe point was encountered; otherwise, it will act as if a traditional probe point was hit.

Necessary conditions that need to be satisfied in order for the particular probe point to be enabled. The user-defined GEL file can be placed in the "Expression"dialog box inside the Probe Point manager window. This will ensure that the probe point will only be enabled provided a user-defined condition (as defined by a GEL file) is met.

Hardware Probe Points

Hardware probe points operate the same way as regular probe points, except they are implemented using hardware breakpoints instead of software breakpoints (See Hardware Breakpoints). Hardware probe points are useful for setting probes in ROM memory or tracing memory accesses. The target processor is temporarily halted by the host processor when a hardware probe point is encountered. Therefore, the target application may not be able to meet real-time constraints when using hardware probe points.

To Trace Memory Accesses:
1. From the menu, choose FILE-FILE 1/0 to create a file object that stores the data at the memory location you wish to trace (See File Input/Output).
2. Choose ADD PROBEPOINT command from the File 1/0 dialog box.

3. For the Probe Type, choose "probe on <bus><Read/Write/R/w> at location".
4. Enter the memory location you want to trace.
5. Select the file object created in Step 1 from the Connect To drop down list
6. Press the ADD button to create a new probe point. This will then cause a new probe point to be created and enabled.
7. Press the OK button to close the window Using the File Input/Output Capabilities The IDE allows you to stream data onto (or from) the actual/simulated DSP target from a PC file. This is a great way to simulate your code using known sample values. The File Input/Output feature uses the Probe Point concept. A probe point allows the user to extract/inject samples, or take a snapshot of memory locations at a user-defined point (i.e. probe point). A probe point can be set at any point in your algorithm (similar to the way a breakpoint is set). When the execution of the program reaches a probe point, the connected object (whether it is a file, graph or memory window) is updated. Once the connected object is updated, execution continues. Using this concept, if we set a probe point at a specific point in the code, and then connect a file to this probe point, we can implement File 1/0 functionalities.

A file can be associated with either an input signal or an output signal. At a specific probe point, a stream of data can be either read from or written to a specified file.

To Stream data to/from a File:
1. Set a Probe Point: Before we specify information on the file, it is best to set the probe point and leave it unconnected. The probe point tells the IDE when you want to start streaming data from/to the file. That is, once the execution of the code reaches this point, the IDE will update (or read from) the file that is connected to the probe point. Once it is finished, it will start executing again. To set a probe point, simply set your cursor at the point where you want to set the probe point. Press the Toggle Probe Point button on the tool bar.
2. Select the FILE-FILE 1/0 command in the Pull Down Menu. Once entered, you will be prompted for specific information on FILE 1/0. * The first folder in the dialog box contains information regarding File Input and the second folder is for File Output.
3. Now let's choose a specific file by pressing the ADD FILE button in either the FILE INPUT folder or the FILE OUTPUT folder. Once you have selected a file it will appear in the appropriate box. Note that more than one file can be chosen for either file input or file output. The data file can be either a COFF object file or a GO DSP data file (See Data File Formats).
4. The fields below the file list box correspond to specific information on each file. They are associated with the current file that is selected. Therefore, select a file by clicking on its name. We need to connect the file to a particular probe point. When the file is first created, it is not connected to any probe point. This is indicated by the "Not Connected" message in the probe point box. To connect the file to a probe point click on the Probe Point button on the bottom and follow the instruction in the Probe Point section. Once the file has been connected to a probe point successfully, the Probe Point Box will read "Connected".
5. For each file selected enter valid start address, length and type values. The address field corresponds to where you want the data to be transferred to (file input) or transferred from (file output). You can enter a valid label or a numeric address in this field. The length field indicates how many samples are to be transferred to the target board (file input) or from the target board (file output) every time the selected probe point is reached. Data can be transferred to either DATA or PROGRAM by selecting the appropriate type. You can enter any valid C expression for the start address and length fields. These expressions are re-calculated EVERY time samples are to be read (or written) from (to) the target. Therefore, if you enter a symbol in this field which later changes values, you do not have to re-enter this parameter.
6. Once you press the OK button the IDE will verify the parameters you have entered and then perform file 1/0 when the associated probe points are reached.

Wrap Around Mode

For an Input File you have the option to select "Wrap Around" mode. This mode can be used to loop a file such that when the end of the file is reached, access then starts from the top. This feature is useful when you would like to generate a periodic signal from a file (e.g. sin). If the "Wrap Around" mode is not selected and the end of file is reached, you will be prompted with a message indicating the end of file condition and the DSP program will be halted.

File I/0 Controls

The File I/0 Control windows allow you to monitor and control the progress of the File 1/0 transaction. The Play button can be used to resume file 1/0 transactions after it has been paused by the stop button. The Stop button will halt all transfer of data from/to the file regardless of whether a probe point was hit or not. This button can be used to temporarily halt the file I/0 transfers. The Rewind to Beginning button will reset the file. For File Input, the next samples will be read from the top of the file. For File Output, all existing samples are deleted and the new samples are written to the top of the file. The Fast Forward button can be used to simulate an artificial Probe Point Hit. When this button is pressed, the file 1/0 will perform the same transaction it performs when the target hits a probe point.

In addition to these control buttons, the File I/0 Control windows also show the progress of the file transactions. For File Input, a progress bar indicates the percentage of samples that have been read from the file and then written to the target. For File Output, the number indicates the number of samples that have currently been written to the file.

The Graph Window

The IDE incorporates an advanced signal analysis interface designed to enable developers to monitor signal data more critically and thoroughly. The new features are useful in developing applications for communications, wireless, image processing, as well as general DSP applications. Use of the graphing capabilities of the IDE to view signals on an actual/simulated target DSP system will now be described in more detail.

All graphical display windows within the IDE environment are dockable by default. The user is, therefore, able to align the graphical display window to any section of the IDE environment screen. Disabling the "Allow Docking" property for the graph window allows for the window to he "taken out" of the general the IDE parent window to anywhere on the desktop.

Time/Frequency

The VIEW-GRAPH-TIME/FREQUENCY command can be used for graphical displays of data. Signals can be viewed in either the time or frequency domain and the graph update can be triggered at any point in your program (see Connecting a Display Window to a Probe Point for more details).

When reviewing the options, keep in mind that there are actually two buffers associated with the graph window: the "Acquisition Buffer" and the "Display Buffer". The "Acquisition Buffer" resides on the actual/simulated target board. It contains the data that you are interested in. When a Graph is to be updated, the Acquisition Buffer is read from the actual/simulated target board and is used to update the Display Buffer. The Display Buffer resides in the host memory so it is possible to keep a history of the data. It is the Display Buffer data that is eventually graphed. For a detailed description on how the graph routine operates, please refer to Details on the GRAPH Operations. Table 9 typifies the options available for the VIEW-GRAPH-TIME/FREQUENCY command, and how they are displayed.

TABLE 9

Time/Frequency Graph options

| | |
|---|---|
| Display Type | Graph Title |
| Start Address | Data Page (C2xx/C5x/C54x) |
| Acquisition Buffer Size | Index Increment |
| Display Data Size | DSP Data Type |
| Q-Value | Sampling Rate |
| Plot Data From | Left-Shifted Data Display |
| Autoscale | DC-Value |
| Maximum Y Value | Axes Display |
| Display Unit | Status Bar Display |
| Display Scale | Data Plot Style |
| Grid Style | Cursor Mode |

Once the graph is displayed, any of the above parameters can be changed by right mouse clicking on the particular graph window, selecting Properties" and adjusting the appropriate parameters. Changing the options will force the graph to read samples (Acquisition Buffer) from the actual/simulated target board and update the graph. All the input fields are C expression input fields.

Five display types can be selected to allow for viewing data in a number of different ways. The five display type options associated with a particular graph, along with the appropriate explanations of what each display type corresponds to are as follows:

1) Single Time
   The data in the Display Buffer will be plotted on a magnitude versus time graph with no preprocessing. A single time trace of a signal is displayed on the graph.
2) Dual Time
   The data in the Display Buffer will be plotted on a magnitude versus time graph with no preprocessing. A dual time trace of signal(s) is displayed on the graph, allowing the user to plot two time domain traces into a single graph window. When this option is set, an additional property item appears in the Graph Properties window—Interleaved Data Sources, allowing you to provide further specifications on whether the data sources are interleaved into 1 acquisition buffer or if they come from 2 separate buffets.
3) FFT Magnitude
   A Fast Fourier Transform (FFT) is performed on the data in the Display Buffer and a magnitude versus frequency graph is plotted. The FFT routine uses the FFT Framesize (rounded up to the nearest power of 2) to determine the minimum number of samples. When the FFT Magnitude display data type is selected, two additional property items appear in the Graph Properties window—Interleaved Data Sources and Signal Type, allowing the user to provide further specification on the nature of the signal sources. Three additional property items are also displayed when viewing an FFT Magnitude graph, as indicated below: In addition, when the FFT Magnitude graphical display option is selected, a property field option Display Peak and Hold is displayed, allowing for further specification on how the history of the samples is graphically maintained.
   a) FFT Framesize—specifies the number of samples used in each FFT calculation (PLEASE NOTE: The acquisition buffer can be a different size than the FFT Framesize)
   b) FFT Order—specifies the FFT Size=2 FFT Order,
   c) FFT Windowing Function -scrollable list including 4 windowing functions Rectangle, Bartlett, Blackman, Harming, Hamming), performed on the data before the FFT calculation is performed
4) Complex FITT
   An FFT consisting of a real and imaginary data portion will be displayed on 2 graphs that are contained in the same graphical display window. When the Complex FFT display data type is selected, two additional property items appear in the Graph Properties window—Interleaved Data Sources and Number of Signal Sources, allowing the user to provide further specification on the nature of the signal sources. Three additional property items are also displayed when viewing a Complex FFT graph, as indicated below:
   a) FFT Framesize—specifies the number of samples used in each FFT calculation (PLEASE NOTE: The acquisition buffer can be a different size than the FFT Framesize)
   b) FFT Order—specifies the FFT Size=2 FFT Order
   c) FFT Windowing Function—scrollable list including 4 windowing functions (Rectangle, Bartlett, Blackman, Harming, Hamming), performed on the data before the FFT calculation is performed
5) FFT Magnitude and Phase
   An FFT consisting of a magnitude and phase portion will be displayed in the same graphical display window. When the FFT Magnitude and Phase display data type is selected, two additional property items appear in the Graph Properties window—Interleaved Data Sources and Number of Signal Sources, allowing the user to provide further specification on the nature of the signal sources. Three additional property items are also displayed when viewing an FFT Magnitude and Phase graph, as indicated below:
   a) FFT Framesize—specifies the number of samples used in each FFT calculation (PLEASE NOTE: The acquisition buffer can be a different size than the FFT Framesize)
   b) FFT Order—specifies the FFT Size=2 FFT Order
   c) FFT Windowing Function—scrollable list including 4 windowing functions (Rectangle. Bartlett, Blackman, Hanning, Hamming), performed on the data before the FFT calculation is performed
   In addition, when the FFT Magnitude and Phase graphical display option is selected, a property field option Display Peak and Hold is displayed, allowing for further specification on how the history of the samples is graphically maintained.
6) FFT Waterfall
   An FFT is performed on the data in the Display Buffer and a magnitude versus frequency graph is plotted as a frame. A chronological series of these frames forms an FFT waterfall graph. When the FFT Waterfall display data type is selected, two additional property items appear in the Graph Properties window—Interleaved Data Sources and Signal Type, allowing the user to provide further specification on the nature of the signal sources. Five additional property items are also displayed when viewing an FFT Waterfall graph, as indicated below:

a) FFT Framesize—specifies the number of samples used in each FFT calculation (PLEASE NOTE: The acquisition buffer can be a different size than the FFT Framesize)

b) FFT Order—specifies the FFT Size=2 FFT Od,; there will be zero padding if FFT Framesize is smaller than FFT Order c) FFT Windowing Function—scrollable list including 5 windowing functions (Rectangle, Bartlett. Blackman, Hanning, Hamming), performed on the data before the FFT calculation is performed d) Number of Waterfall Frames—specifies the number of waterfall frames to be displayed e) Waterfall Height (%)—specifies the percentage of vertical window height that is used to display a waterfall frame Graph Title—Each graph that you create can be identified by an appropriate title. This helps to distinguish results when there are many windows open.

Signal Type—This graph display option allows the user to specify the TYPE of signal source that is to be used to produce a particular graph. Two options are available for the Signal Type property—real (corresponding to a single source display in the case of a single time display, for instance) and complex (corresponding to two signal sources). When COMPLEX is selected, the Interleaved Data Source option is displayed allowing for specification of whether the signal sources are interleaved.

Start Address—This is the starting location (on the actual/simulated target board) of the Acquisition Buffer containing the data to be graphed. When the Graph is to be updated, the Acquisition Buffer starting at this location is fetched from the actual/simulated target board. This Acquisition Buffer is then used to update the Display Buffer. It is the display buffer that is graphed. You can enter any valid C expression for the start address field. This expression is recalculated EVERY time samples are to be read from the actual/simulated target. Therefore, if you enter a symbol in this field, which later changes values, you do not have to re-enter this parameter.

Acquisition Buffer Size—This is the size of the Acquisition Buffer you are using on your actual/simulated target board. For example, if you are processing samples one-at-a-time in a serial fashion, enter 'I' in this field. For this example, ensure that you have enabled the Left Shifted Data Display option and have connected the display to the correct location in your DSP program (see Connecting a Display Window to a Probe Point for more details). If your program processes an entire frame at a time (i.e. more than one sample) and you are only interested in that particular frame, it is recommended that you enter the same value for the Acquisition Buffer Size and the Display Size. You should also turn off the Left Shifted Data Display option. When a graph is to be updated, the Acquisition Buffer is read from the actual/simulated target board and is used to update the Display Buffer. It is the Display Buffer that is graphed. You can enter any valid C expression for the acquisition buffer size field. This expression is re-calculated EVERY time samples are to be read from the actual/simulated target. Therefore, if you enter a symbol in this field, which later changes values, you do not have to re-enter this parameter.

Index Increment—This field allows the user to specify the sample index increment for the graphical display of data. A specification in this field is equivalent to a sample OFFSET for non-interleaved sources. This permits the user to extract signal data from multiple sources using a single graphical display—an index increment of 2, for instance, corresponds to a sample offset value of 2, which in turn graphically displays every other sample in the acquisition buffer. The user can therefore specify multiple data sources for display by entering a corresponding offset value in this field. This option provides a general specification for interleaved sources. If the Interleaved Data Sources option is selected, the index increment option is disabled.

Display Data Size—This is the size of the Display Buffer that you want to use. It is the Display Buffer that is graphed on your screen. The Display Buffer resides on the host, so that a history of your signal can be displayed even though it no longer exists on the actual/simulated target board. The size of the display is determined differently depending on what you have selected for the Time Domain/Frequency Domain (Display Type) option. For a time domain graph, the Display Data Size contains the number of samples that the graph will display. No preprocessing is done on the display buffer. Usually the Display Data Size is greater than or the same as the Acquisition—Buffer Size. If the Display Data Size is greater than the Acquisition Buffer Size, the Buffer data can be Left Shifted into the Display Buffer. For a frequency domain graph (FFT Magnitude, Complex FFT, FFT Magnitude and Phase), the Display Size is represented by the FFT Framesize (rounded up to the nearest power of 2) used for the FFT frequency analysis. You can enter any, valid C expression for the display data size field. This expression is re-calculated EVERY time samples are to be read from the actual/simulated target. Therefore, if you enter a symbol in this field which later changes values, you do not have to re-enter this parameter.

Interleaved Data Sources—Toggling this display option allows for a single buffer input to represent 2 sources. Setting this particular option to ""Yes" implies a 2-source input buffer where the odd samples represent the first source and even samples represent the second. Setting this option to ""Yes" creates only a single Start Address prompt in the Graphical Properties window, corresponding to the single buffer input (with dual interleaved sources). Setting this option to ""No" creates two starting address fields, corresponding to two buffer source signal inputs not interleaved.

The following are the additional display options created when the "No" option is selected for Interleaved Data Sources in conjunction with particular display types:

If Dual Time is selected:
      1) Start Address—upper display
      2) Start Address—lower display
   If any of the following display types are selected: FFT Magnitude, Complex FFT, FFT Magnitude and Phase, the following start address options appear:
      1) Start Address—real data
      2) Start Address—imaginary data The graph menu contains many options to allow the user to be flexible in the way they want to display the information. This section contains a brief description on how the graph routine works to let you master all capabilities of the Graph Window.

Once all options are entered on the graph menu screen, the graph window gets a Sample Buffer of DSP data of length Acquisition Buffer Size starting at DSP location Start Address in the data memory space. A Display Buffer of size Display Data Size is allocated within the host memory with all its values initialized to zero.

If the Left-Shifted Data Display option is chosen, the entire Display Buffer is left shifted by Acquisition Buffer Size with the values of the DSP Acquisition Buffer shifted in from the right end. If the Left-Shifted Data Display option is not chosen then the values of the Display Buffer are simply overwritten by the DSP Acquisition Buffer. The Left-Shifted Data Display option is useful when you are processing a signal in serial fashion. Although the samples are only available one at a time, the Left Shift Option lets you view a history of the samples. When the associated probe point is reached (See Probe Points for details) a block of DSP data is read and the display is updated.

If Frequency Domain analysis is chosen, the Display Buffer is run through an FFT routine to give a frequency domain analysis of the data. If the Time Domain analysis is chosen, no preprocessing is done on the display data before it is graphed.

Once the graph is displayed, any of the above parameters can be changed by right mouse clicking on the particular graph window, selecting "Properties" and adjusting the appropriate parameters. Changing options will force the graph to read samples (Acquisition Buffer) from the actual/simulated DSP target board and update the graph.

Constellation Diagram

The VIEW-GRAPH-CONSTELLATION allows the user to graphically measure how effectively the information is extracted from the input signal. The input signal is separated into two components and the resulting data is then plotted using the Cartesian coordinate system in the time fashion by plotting one signal versus the other (Y Source versus X Source where Y Source is plotted in the direction of Y axis and X Source in the direction of X-axis). Graph update can be triggered at any point in your program (see Connecting a Display Window to a Probe Point, for more details).

When reviewing the options, keep in mind that there are actually two buffers associated with the graph window for each signal: the "Acquisition Buffer" and the "Display Buffer". The Acquisition Buffer resides on the actual/simulated target board. It contains the data that you are interested in. When a Graph is to be updated, the Acquisition Buffer is read from the actual/simulated target board and is used to update the Display Buffer. The Display Buffer resides in the host memory so it is possible to keep a history of the data. It is the Display Buffer data that is eventually graphed. For a detailed description on how the graph routine operates, please refer to Details on the GRAPH Operations. Table 10typifies the options available for the VIEW-GRAPH-CONSTELLATION command, and how they are displayed:

TABLE 10

Constellation Graph options

| | |
|---|---|
| Graph Title | Interleaved Data Sources |
| Start Address | Data Page (C2xxIC5xIC54x) |
| Acquisition Buffer Size | Index Increment |
| Constellation Points | DSP Data Type |
| Q-Value | Minimum X Value |
| Maximum X Value | Minimum Y Value |
| Maximum Y Value | Symbol Size |
| Axes Display | Status Bar Display |
| Grid Style | Cursor Mode |

Once the graph is displayed, any of the above parameters can be changed by right mouse clicking on the particular graph window, selecting ""Properties" and adjusting the appropriate parameters. Changing the options will force the graph to read samples (Acquisition Buffer) from the actual/simulated target board and update the graph.

Constellation Points—This is the size of the Display Buffer that you want to display. It is the Display Buffer that is graphed on your screen. The Display Buffer resides on the host so that a history of your signal can be displayed even though it no longer exists on the actual/simulated target board. Constellation Points contains the maximum number of samples that the graph will display. Usually the Constellation Points is greater than or the same as the Acquisition Buffer Size. If the Constellation Points is greater than the Acquisition Buffer Size, the Acquisition Buffer data is left shifted into the Display Buffer. You can enter any valid 'C' expression for the constellation points field. This expression is calculated once when you click OK button in the graph property dialog.

Eye Diagram

The VIEW-GRAPH-EYE DIAGRAM command can be used for qualitatively examining signal fidelity. Incoming signals are continuously superimposed upon each other within a specified display range and displayed in an t1ye shape"-signal clarity becomes directly proportional to the area covered by the eye diagram. The periodicity of the signal is shown in the time fashion by plotting the signal in a serial manner and wrapping it around when a Zero-Crossing is detected. Graph update can be triggered at any point in your program (see Connecting a Display Window to a Probe Point for more details).

When reviewing the options, keep in mind that there are actually two buffers associated with the graph window: the "Acquisition Buffer" and the "Display Buffer". The Acquisition Buffer resides on the actual/simulated target board. It contains the data that you are interested in. When a Graph is to be updated, the Acquisition Buffer is read from the actual/simulated target board and is used to update the Display Buffer. The Display Buffer resides in the host memory so it is possible to keep a history of the data. It is the Display Buffer data that is eventually graphed. For a detailed description on how the graph routine operates, please refer to Details on the GRAPH Operations. Table typifies the options available for the VIEW-GRAPH-EYE DIAGRAM command, and how they are displayed:

TABLE 11

Eye Diagram options

| | |
|---|---|
| Graph Title | Trigger Source |
| Interleaved Data Sources | Start Address |
| Data Page (C2xxIC5xIC54x) | Acquisition Buffer Size |
| Index Increment | Persistence Size |
| Display Length | Minimum Interval Between Triggers |
| Pre-Trigger (in samples) | DSP Data Type |
| Q-Value | Sampling Rate |
| Trigger Level | Maximum Y Value |
| Axes Display | Time Display Unit |
| Status Bar Display | Grid Style |
| Cursor Mode | |

Once the graph is displayed, any of the above parameters can be changed by right mouse clicking on the particular graph window, selecting "Properties" and adjusting the appropriate parameters. Changing the options will force the graph to read samples (Acquisition Buffer) from the actual/simulated target board and update the graph.

Persistence Size—This is the size of the Display Buffer that you want to display. It is the Display Buffer that is graphed on your screen. The Display Buffer resides on the host, so that a history of your signal can be displayed even though it no longer exists on the actual/simulated target board. The Persistence Size contains the number of samples in history that the graph will display. Usually the Persistence Size is greater than or the same as the Acquisition Buffer Size. If the Persistence Size is greater than the Acquisition Buffer Size, the Acquisition Buffer data is left shifted into the Display Buffer. Please note that the graphing on screen is cumulative and that, as a result, the graph window may display more samples than the specified Persistence Size. Any older data can be flushed "out" from the Display Buffer with incoming samples in excess of the specified Persistence Size by right mouse clicking on the window and selecting Refresh" This will equate the Persistence Size to the Display Buffer length.

Pre-Trigger (in samples)—This option sets the number of samples to be displayed before the left trigger point. It has the effect of panning the left trigger point towards the left or right hand side of the screen. This option is useful in visualizing the signal around the trigger point. Setting this option to zero will place the left trigger point on the left boundary of the graph window. Setting this option to a positive value will move the left trigger point towards the right boundary of the window. Setting this option to a negative value will move the left trigger point to the left side of the left boundary window, which is outside the window. With the effect of wrap-around, the point is moved away from the right boundary of the window.

When the graph is to be updated, the entire Display Buffer is left shifted by Acquisition Buffer Size with the values of the DSP Acquisition Buffer shifted in from the right end. This is useful when you are processing a signal in a serial fashion. Although the samples are only available one at a time, this manner lets you view a history of the samples. When the associated probe point is reached (See Probe Points for details) a Block of DSP data is read and the Display is updated.

Once the graph is displayed, any of the above parameters can be changed by right mouse clicking on the particular graph window, selecting "Properties" and adjusting the appropriate parameters. Changing options will force the graph to read samples (Acquisition Buffer) from the actual/simulated DSP target board and update the graph.

What is claimed is:

1. An integrated code development tool for a host processor operable to develop a program executing on a target processor, comprising:
   an editor,
   a project management and build system,
   a debugger,
   a profiler, and
   a graphical data analysis system, and
   wherein said editor is operable to provide a source code view which is simultaneously capable of integrating with said debugger to provide for stepping through code and setting breakpoints, and integrating with the output of said build system to display source code interleaved with corresponding assembler code created by said build system.

2. The tool of claim 1, wherein said editor is further operable to provide a source code view which is simultaneously capable of:
   integrating with said profiling system to provide profile points at any source code location, and
   integration with said project management system, which includes creating real-time instrumentation objects within the project.

3. The tool of claim 1, wherein said editor is operable to set probe points having the ability to synchronize the execution of a program statement with a conditional debugging action and then to continue execution.

4. The tool of claim 3, wherein a probe point is operable to initiate at least one of the following activities:
   streaming data from a file onto the DSP target,
   streaming data from the DSP target to a file,
   triggering any one of the graphical data displays to update its view, or
   running a script function that can be modified to perform a broad number of debugging functions.

5. The tool of claim 1, wherein said debugger is operable to create a real-time data exchange channel between the target and host for transferring a stream of data to or from the target while the target is executing the program.

6. The tool of claim 1, wherein said graphical data analysis system is operable to be updated in a manner that can be synchronized to probe points.

7. The tool of claim 1, wherein the graphical data analysis system is operable to display a graph of data created by a program being developed on the target processor while the target processor continues to run the program.

8. The tool of claim 7, wherein the program being developed on the target processor stores the created data in an acquisition buffer on the target processor.

9. The tool of claim 8, wherein the graphical data analysis system further comprises a display buffer on the host processor for holding a copy of the created data for display.

10. The tool of claim 9, wherein the tool is operable to update the display buffer by transferring created data from the acquisition buffer in response to a probe point associated with a selected program statement in the program being developed.

11. The tool of claim 10, wherein the probe point is selectively either a soft probe point or a hard probe point.

12. The tool of claim 7, wherein the graphical data analysis system is operable to selectively display a graph of created data in either a time domain or a frequency domain.

13. The tool of claim 7, wherein the graphical data analysis system is operable to selectively display a graph of created data as raw data or as data processed with a fast Fourier transform (FFT).

14. The tool of claim 7, wherein the graphical data analysis system is operable to selectively display a graph of created data as a constellation diagram or as an eye diagram.

15. The tool of claim 7, wherein the graphical data analysis system is operable to continuously update a graph of created data buffer in response to a probe point associated with a selected program statement in the program being developed, such that a waterfall graph is formed.

16. An integrated code development tool for a host processor operable to develop a program executing on a target processor, comprising:
   an editor,
   a build system,
   a debugger, and
   wherein said editor is operable to provide a source code view which is simultaneously capable of integrating with said debugger to provide for stepping through code and setting breakpoints, and integrating with the output of said build system to display source code interleaved with corresponding assembler code created by said build system.

17. A method for developing a program for execution on a target processor using an integrated code development tool having a graphical user interface (GUI) operating on a host processor, comprising the steps of:

writing the program using an editor contained within the tool;

displaying source code of the program via the GUI interleaved with corresponding assembler code of the program created by a build system portion of the tool;

placing a probe point in the program by selecting a line of the source code or a line of the assembler code via the GUI;

executing the program to create a set of created data in response to a command from the tool; and displaying a graph of the created data on the GUI using a data analysis portion of the tool while the target processor continues to run the program.

18. The method of claim 17, further comprising the step of updating the graph each time the probe point is reached during execution of the program.

19. The method of claim 18, wherein the program is executed by simulating the target processor on the host processor.

* * * * *